United States Patent
Vivet et al.

(10) Patent No.: US 12,466,403 B2
(45) Date of Patent: Nov. 11, 2025

(54) METHOD AND DEVICE FOR REGULATING THE SPEED OF AN AUTONOMOUS VEHICLE

(71) Applicant: PSA AUTOMOBILES SA, Poissy (FR)

(72) Inventors: Luc Vivet, Paris (FR); Sofiane Ouanezar, Maule (FR)

(*) Notice: Subject to any disclaimer, the term of this patent is extended or adjusted under 35 U.S.C. 154(b) by 240 days.

(21) Appl. No.: 18/253,753

(22) PCT Filed: Nov. 4, 2021

(86) PCT No.: PCT/FR2021/051947
§ 371 (c)(1),
(2) Date: May 19, 2023

(87) PCT Pub. No.: WO2022/129716
PCT Pub. Date: Jun. 23, 2022

(65) Prior Publication Data
US 2024/0010197 A1    Jan. 11, 2024

(30) Foreign Application Priority Data

Dec. 17, 2020 (FR) ...................................... 2013450

(51) Int. Cl.
*B60W 30/14* (2006.01)
*B60W 30/16* (2020.01)
*B60W 40/105* (2012.01)
*B60W 60/00* (2020.01)
*H04W 4/40* (2018.01)

(52) U.S. Cl.
CPC .......... *B60W 30/143* (2013.01); *B60W 30/16* (2013.01); *B60W 40/105* (2013.01); *B60W 60/001* (2020.02); *H04W 4/40* (2018.02); B60W 2554/802 (2020.02); B60W 2556/45 (2020.02)

(58) Field of Classification Search
CPC .. B60W 30/143; B60W 60/001; B60W 30/16; B60W 40/105; B60W 2556/45; B60W 2554/802; H04W 4/40
See application file for complete search history.

(56) References Cited

U.S. PATENT DOCUMENTS

| | | | |
|---|---|---|---|
| 10,328,938 B2 | 6/2019 | Schubert | |
| 2004/0024529 A1* | 2/2004 | Ibrahim | B60K 31/0008 340/436 |
| 2010/0106364 A1* | 4/2010 | Sagisaka | H04W 52/282 701/36 |
| 2011/0040467 A1 | 2/2011 | Breuer | |
| 2012/0053807 A1* | 3/2012 | Salinger | B60W 50/12 701/93 |
| 2020/0276972 A1 | 9/2020 | Ito | |
| 2022/0402491 A1* | 12/2022 | Jaekel | B60W 30/18159 |
| 2023/0234585 A1* | 7/2023 | Debeauvais | B60W 50/0097 701/93 |

FOREIGN PATENT DOCUMENTS

| | | |
|---|---|---|
| EP | 3604066 A1 | 2/2020 |
| EP | 3699632 A1 | 8/2020 |
| JP | 2008018941 A * | 1/2008 |

OTHER PUBLICATIONS

JP2008018941A machine translation (Year: 2008).*
International Search Report for PCT/FR2021/051947 mailed Jan. 25, 2022.
Written Opinion for PCT/FR2021/051947 mailed Jan. 25, 2022.

* cited by examiner

*Primary Examiner* — Navid Z. Mehdizadeh
*Assistant Examiner* — Oliver Tan
(74) *Attorney, Agent, or Firm* — Sandberg Phoenix & von Gontard PC

(57) ABSTRACT

The invention relates to a method and a device for regulating the speed of an autonomous vehicle, referred to as ego vehicle, comprising an adaptive cruise control, said method comprising the steps of activating (201) said adaptive cruise control, receiving (202) information relating to said target vehicle, referred to as target information, receiving (203) information relating to said ego vehicle, referred to as ego vehicle information, determining (204) an inter-vehicle time, determining (205) an alert signal from said target information and said ego vehicle information, determining conditions (206) for substituting (207) a target acceleration for a setpoint acceleration of said cruise control.

10 Claims, 2 Drawing Sheets

[Fig. 1]
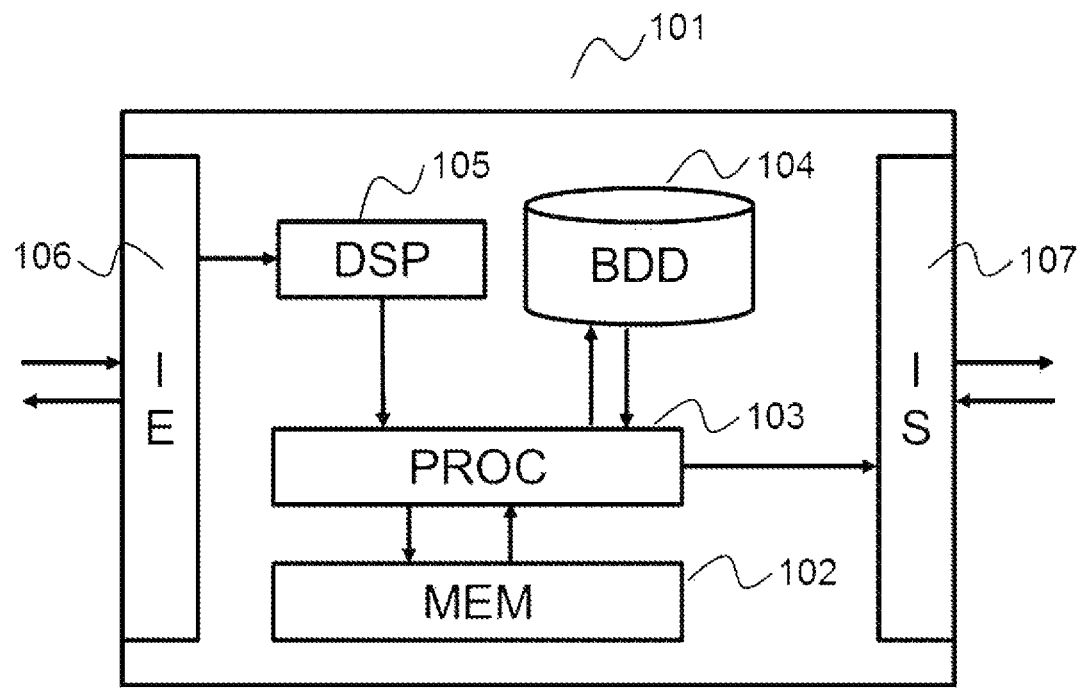

[Fig. 2]
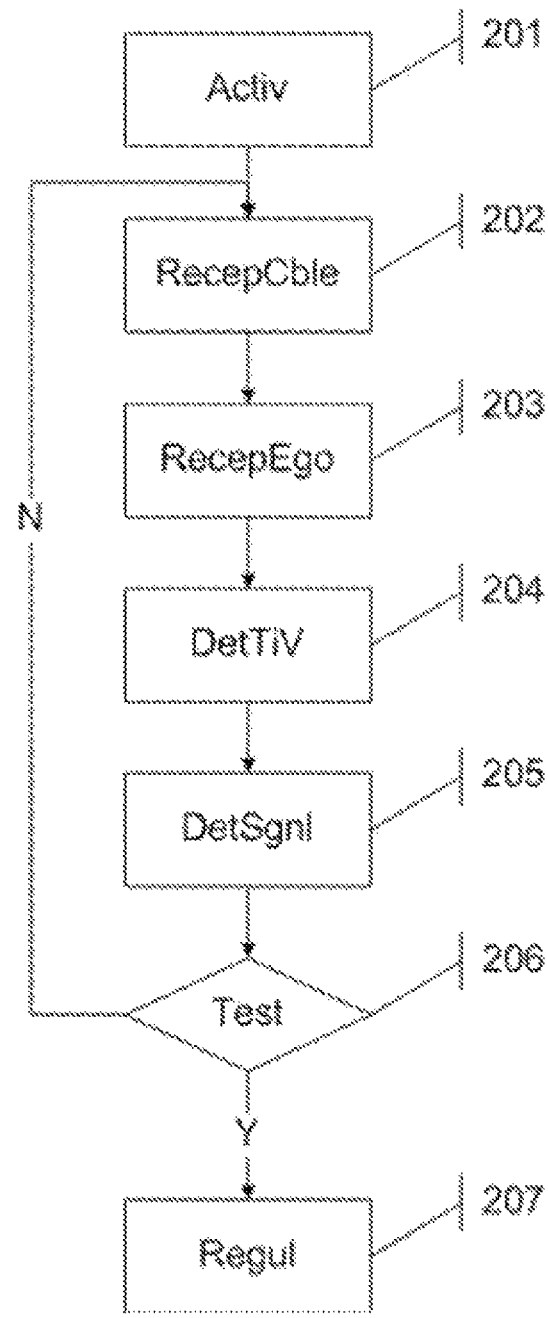

METHOD AND DEVICE FOR REGULATING THE SPEED OF AN AUTONOMOUS VEHICLE

CROSS-REFERENCE TO RELATED APPLICATIONS

This application is the US National Stage under 35 USC § 371 of International Application No. PCT/FR2021/051947, filed Nov. 4, 2021 which claims the priority of French App. No. 2013450 filed on Dec. 17, 2020, the content (text, drawings and claims) of which is incorporated by reference herein.

BACKGROUND

An autonomous vehicle driving assistance system is disclosed. In particular, a system is disclosed for regulating the speed of an autonomous vehicle by an adaptive cruise control.

"Acceleration" of a vehicle is understood to mean a variation in the speed of the vehicle per unit of time. This acceleration is positive or negative. Deceleration is a negative acceleration. "Vehicle" is understood to mean any type of vehicle such as a motor vehicle, a moped, a motorcycle, a storage robot in a warehouse, etc. "Autonomous driving" of an "autonomous vehicle" is understood to mean any method capable of assisting with the driving of the vehicle. The method can thus consist of partially or totally directing the vehicle or of providing any type of assistance to a physical person driving the vehicle. The method thus covers all types of autonomous driving, from level 0 to level 5 in the scale of the International Organization of Motor Vehicle Manufacturers (OICA).

An adaptive cruise control (ACC) is a known ADAS system that regulates a vehicle speed and an inter-vehicle time, the inter-vehicle time representing a duration separating the passing of the front or rear of two consecutive vehicles on a single traffic lane. For example, the inter-vehicle time is a parameter predetermined by the driver or by default according to a recommendation of the regulations in force (2 seconds for example). A simple relation links the inter-vehicle time to an inter-vehicle distance by the vehicle speed. An ACC of an autonomous vehicle generally comprises RADAR or LiDAR which is able to detect a preceding vehicle, referred to as target vehicle, and to measure the inter-vehicle distance between the autonomous vehicle and the target vehicle. The speed and acceleration of the target vehicle are also measured or determined. The ACC is then able to determine the inter-vehicle time from the inter-vehicle distance and the speed of the autonomous vehicle. However, when the target vehicle decelerates to stop with a strong deceleration (negative acceleration) due to a delay in receiving measured data, the calculation times of the setpoints and the actuators (of the order of 500 ms), the inter-vehicle distance is not respected. This is all the more pronounced when the speed is low (less than 50 km/h). The autonomous vehicle then approaches the target vehicle too abruptly, generating a feeling of psychological discomfort for an occupant of the vehicle and sometimes triggering emergency braking.

SUMMARY

It is an object to remedy the above-mentioned problem, in particular to gain responsiveness and to improve the psychological comfort of an occupant of the autonomous vehicle.

For this purpose, a first aspect relates to an adaptive cruise control method for an autonomous vehicle, referred to as ego vehicle, the method comprising the steps of:

Activating the adaptive cruise control, wherein said adaptive cruise control is based on an acceleration setpoint calculated from a predetermined inter-vehicle time setpoint, the inter-vehicle time defining a following distance between the ego vehicle and a target vehicle in front of the autonomous vehicle;

Receiving information relating to said target vehicle, referred to as target information, said target information comprising a distance of the target vehicle with respect to the ego vehicle, referred to as target distance, and an acceleration of the target vehicle, referred to as target acceleration;

Receiving information relating to the ego vehicle, referred to as ego vehicle information, said ego vehicle information characterizing a speed of said ego vehicle, referred to as ego speed;

Determining a calculated inter-vehicle time as a function of the target information and the ego vehicle information;

Determining a state of an alert signal from the target information and the ego vehicle information, the alert signal being in an active state when the calculated inter-vehicle time is less than a predetermined percentage of the predetermined inter-vehicle time setpoint;

If the alert signal is in the active state and if the target acceleration is less than the calculated acceleration setpoint, then the method further includes a step of substituting the target acceleration for an acceleration setpoint of said cruise control.

Thus, when the inter-vehicle time is less than a percentage of the predetermined inter-vehicle time and when the target acceleration is less than the calculated acceleration setpoint, the autonomous vehicle starts to approach the target vehicle too abruptly. The cruise control regulates the speed of the autonomous vehicle according to the acceleration of the target vehicle, and therefore decelerates the autonomous vehicle more strongly than if the cruise control regulates the speed of the autonomous vehicle according to the calculated acceleration setpoint. The autonomous vehicle then approaches the target vehicle less abruptly, the distance between the ego vehicle and the target vehicle is greater. There is no need to engage emergency braking. The occupants of the ego vehicle feel greater deceleration from the first moments and then are reassured by a good consideration of the target vehicle. The autonomous vehicle is then more responsive.

Advantageously, the alert signal is in an active state when the target acceleration is also less than a predetermined maximum deceleration threshold. Thus, the target acceleration is only substituted for the calculated acceleration setpoint when the target deceleration is considerable and when strong responsiveness is necessary.

Advantageously, the alert signal is in an active state when the ego speed is also less than a predetermined ego speed threshold.

Thus, it is guaranteed that there is no substitution of the target acceleration for the calculated acceleration setpoint when the ego speed is high (greater than 50 km/h for example) and wherein the speed regulation is less sensitive to delays in receiving measured data, the calculation times of the setpoints and the actuators.

Advantageously, the target information also includes a speed of said target vehicle, referred to as target speed. The alert signal is in an active state when the target speed is less than the ego speed.

Thus, it is guaranteed that there is no substitution of the target acceleration for the calculated acceleration setpoint when the speed of the target vehicle is greater than the ego speed, and that therefore the inter-vehicle distance increases.

Advantageously, said predetermined percentage is a value of between 60 and 120%;

Thus, the higher the value of the predetermined percentage, the greater the speed regulation, which characterizes the road behavior of the ego vehicle.

Advantageously, the alert signal is transmitted by at least one wireless communication channel to at least one infrastructure, to at least one vehicle, and/or to at least one device capable of receiving information transmitted by a wireless communication channel.

Having detected a strong deceleration situation, the autonomous vehicle communicates, for example, the detected situation to other vehicles in order to warn them and so that they adapt their behavior to the situation, for example by slowing down.

A second aspect relates to a device comprising a memory unit associated with at least one processor configured to implement the method according to the first aspect.

A vehicle including the device is disclosed.

A computer program is disclosed which comprises instructions suitable for executing the steps of the method, according to the first aspect, when the program is executed by at least one processor.

DESCRIPTION OF THE FIGURES

Other features and advantages of the invention will become apparent from the description of the non-limiting embodiments of the invention below, with reference to the appended figures, in which:

FIG. 1 schematically shows a device, according to a particular embodiment of the disclosed method.

FIG. 2 schematically shows a method for assisting with regulating the speed of an autonomous vehicle.

DETAILED DESCRIPTION

The new system is described below in its non-limiting application to the case of an autonomous motor vehicle driving on a road or on a traffic lane. Other applications such as a robot in a storage warehouse or else a motorcycle on a country road are also conceivable.

FIG. 1 depicts an example of a device 101 comprised in the vehicle, in a network ("cloud") or in a server. This device 101 can be used as a centralized device in charge of at least some steps of the method described below with reference to FIG. 2. In one embodiment, it corresponds to an autonomous driving computer.

In the disclosed embodiment, the device 101 is included in the vehicle.

This device 101 may take the form of a housing comprising printed circuit boards, any type of computer or even a mobile telephone (i.e., a smartphone).

The device 101 comprises a random-access memory 102 for storing instructions for the implementation by a processor 103 of at least one step of the method as described hereinbefore. The device also comprises mass storage 104 for storing data that are intended to be kept after the implementation of the method.

The device 101 may further comprise a digital signal processor (DSP) 105. This DSP 105 receives data for shaping, demodulating and amplifying these data in a manner known per se.

The device 101 also comprises an input interface 106 for receiving the data implemented by the method and an output interface 107 for transmitting the data implemented by the method.

FIG. 2 schematically shows a method for assisting with regulating the speed of an autonomous vehicle, according to a particular embodiment of the method.

Step 201, "Activ" is a step of activating the adaptive cruise control, the adaptive cruise control being based on an acceleration setpoint calculated from a predetermined inter-vehicle time setpoint, the inter-vehicle time defining a distance between the ego vehicle and a target vehicle in front of the ego vehicle.

Conventionally, an adaptive cruise control calculates, at each instant, the acceleration, the acceleration setpoint, that the ego vehicle must have in order for the ego vehicle to follow a predetermined speed while complying with a predetermined inter-vehicle time. The acceleration is applied by a power train (engine, brake, etc.). The predetermined speed and the inter-vehicle time are entered for example by an occupant, or a driver, of the ego vehicle. Speed regulation modifies the speed of the ego vehicle in order to respect the predetermined inter-vehicle time.

Step 202, "RecepCble", is a step of receiving information relating to the target vehicle, referred to as target information, the target information comprising a distance of the target vehicle with respect to the ego vehicle, referred to as target distance, and an acceleration of the target vehicle, referred to as target acceleration. In one procedure, the target information also comprises a speed of the target vehicle, referred to as target speed.

The target distance, the target speed, and the target acceleration are information obtained periodically by processing measurements from on-board sensors present in a vehicle with a conventional adaptive cruise control. In one procedure, the input interface 106 of the device implementing the invention receives this information.

Step 203, "RecepEgo", is a step of receiving information relating to the ego vehicle, referred to as ego vehicle information, the ego vehicle information including a speed of said ego vehicle, referred to as ego speed.

The ego speed is information obtained periodically by processing measurements from on-board sensors present in a vehicle with a conventional adaptive cruise control. In one procedure, the input interface 106 of the device implementing the invention receives this information.

Step 204, "DetTiV", is a step of determining an inter-vehicle time calculated from the target information and the ego vehicle information. The inter-vehicle time is obtained periodically by multiplying the inter-vehicle distance by the ego speed. This inter-vehicle time is calculated periodically, for example by the device 101.

Step 205, "DetSgnl", is a step of determining a state an alert signal from the target information and the ego vehicle information, the alert signal being in an active state when the calculated inter-vehicle time is less than a predetermined percentage of the predetermined inter-vehicle time. The predetermined percentage is a value of between 60 and 120%, for example 80%. Other values are possible.

Advantageously, the alert signal is in an active state for a combination of the following conditions:

the calculated inter-vehicle time is less than a predetermined percentage of the predetermined inter-vehicle time setpoint;

the target acceleration is less than a predetermined maximum deceleration threshold. For example, the predetermined maximum deceleration threshold is −3 m/s². Other values are possible;

the ego speed is less than a predetermined ego speed threshold. For example, the predetermined ego speed threshold is 50 km/h or 30 mph; other values are possible;

when the target speed is less than the ego speed.

Step 206, "Test" is a step of verifying that the alert signal is in the active state and whether the target acceleration is less than the calculated acceleration setpoint. If so, the ego vehicle approaches the target vehicle too abruptly, the inter-vehicle distance is no longer respected, and the target vehicle decelerates more than the ego vehicle. It is therefore necessary to very rapidly modify the acceleration setpoint calculated by a conventional vehicle cruise control.

Step 207, "Regul", is a step of substituting the target acceleration for an acceleration setpoint of the adaptive cruise control. The acceleration setpoint calculated by a conventional vehicle cruise control is insufficient.

The calculated acceleration setpoint is therefore replaced by the target acceleration, which is lower. The cruise control then takes into account the target acceleration as the acceleration setpoint. This decelerates the ego vehicle more quickly, thus providing the above-mentioned advantages.

Advantageously, the alert signal is transmitted by at least one wireless communication channel to at least one infrastructure, to at least one vehicle, and/or to at least one device capable of receiving information transmitted by a wireless communication channel in order to warn of the declaration. For example, another autonomous vehicle receiving this alert signal and which follows the ego vehicle will be able to anticipate a slowdown and therefore a deceleration.

The system described herein is not limited to the embodiments described above by way of example; it extends to other variants.

Thus, wireless communications are also described hereinbefore. New wireless telecommunications standards include specifications dedicated to motor vehicle applications. Thus, vehicle-to-everything short-range wireless communication channels, referred to as V2X channels, have been specified.

A first type of V2X channel is based on the Wi-Fi standards (IEEE 802.11p) and supports communications between vehicles and between vehicles and infrastructures.

A second type of V2X channel is based on cellular standards, and especially on the 5G standard. This second type of V2X channel supports communications between vehicles, between vehicles and infrastructures or else between a vehicle and a cellular network. Since this type of channel exists in parallel with conventional cellular channels, it is especially referred to as "sidelink", or else "PC5".

V2X communications can also be implemented by a user device.

The invention claimed is:

1. A method for regulating the speed of an autonomous vehicle, referred to as ego vehicle, comprising an adaptive cruise control, said method comprising the steps of:

Activating said adaptive cruise control, wherein said adaptive cruise control regulates a speed of the autonomous vehicle based on a calculated acceleration setpoint determined as a function of a predetermined inter-vehicle time setpoint, said predetermined inter-vehicle time setpoint defining a following distance between said autonomous vehicle and a target vehicle in front of said autonomous vehicle;

Receiving from first sensors information relating to said target vehicle, referred to as target information, said target information comprising a target distance and a target acceleration, said target distance being the distance of said target vehicle in front of said autonomous vehicle, and said target acceleration being an acceleration of said target vehicle;

Receiving from second sensors information relating to said autonomous vehicle, referred to as ego vehicle information, said ego vehicle information comprising a speed of said autonomous vehicle, referred to as ego speed;

Determining a calculated inter-vehicle time as a function of said target information and said ego vehicle information;

Determining a state of an alert signal as a function of said target information and said ego vehicle information, said alert signal being in an active state when said calculated inter-vehicle time is less than a predetermined percentage of said predetermined inter-vehicle time setpoint;

Wherein, if said alert signal is in the active state and if said target acceleration is less than said calculated acceleration setpoint, then said method further includes a step of substituting said target acceleration for said acceleration setpoint of said cruise control; and wherein the adaptive cruise controls a power train of the ego vehicle to regulate the speed of said ego vehicle based on the target acceleration to reduce the speed of the autonomous vehicle.

2. The method according to claim 1, wherein said alert signal is in the active state when said target acceleration is less than a predetermined maximum deceleration threshold.

3. The method according to claim 1, wherein said alert signal is in the active state when said ego speed is less than a predetermined ego speed threshold.

4. The method according to claim 1, wherein said target information comprises a speed of said target vehicle, referred to as target speed, and wherein said alert signal is in the active state when said target speed is also less than said ego speed.

5. The method according to claim 1, wherein said predetermined percentage is a value of between 60 and 120%.

6. The method according to claim 1, wherein said alert signal is transmitted by at least one wireless communication channel to at least one infrastructure, to at least one vehicle, and/or to at least one device capable of receiving information transmitted by a wireless communication channel.

7. A device comprising a memory associated with at least one processor configured to perform the method claim 1.

8. A vehicle comprising the device according to claim 7.

9. A computer program stored in random access memory of at least on processor; the computer program comprising instructions suitable for executing the steps of the method according to claim 1.

10. The method according to claim 1 wherein the step of determining the calculated inter-vehicle time comprises multiplying the inter-vehicle distance by the ego speed.

\* \* \* \* \*